Patented Jan. 15, 1929.

1,698,821

UNITED STATES PATENT OFFICE.

JAMES OGILVIE, OF BUFFALO, NEW YORK, ASSIGNOR TO NATIONAL ANILINE AND CHEMICAL CO., INC., OF NEW YORK, N. Y., A CORPORATION OF NEW YORK.

GREEN DYE OF THE ANTHRAQUINONE SERIES.

No Drawing. Application filed November 6, 1925. Serial No. 67,291.

This invention relates to the manufacture and production of new green dyestuffs of the anthraquinone series which are of value for dyeing wool. The fabric or other material dyed with the new dyestuffs also forms a part of the present invention.

The new dyestuffs can be obtained by sulfonating with oleum in the presence of boric acid the 1.4-diaryl-amino derivatives of anthraquinone which correspond with the general formula

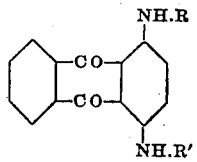

wherein R and R′ signify the same or different aryl radicals of the benzene series such as phenyl, tolyl, xylyl or the like.

The new dyestuffs thus produced are characterized by their greater solubility in water and by their dyeing wool from an acid bath green tints which are appreciably brighter and considerably yellower in shade than the dyestuffs produced by carrying out the sulfonation with oleum or with concentrated sulfuric acid in the absence of boric acid. In the dried and pulverized state in the form of their sodium salts they constitute dark green powders very soluble in water, soluble in alcohol and in acetone, insoluble in chloroform and nearly so in benzene.

The invention will be further illustrated by the following specific example, but it is understood that the invention is not limited thereto. The parts are by weight.

Example: 5 parts of dry boric acid are dissolved in 100 parts oleum containing 26 percent free sulfuric anhydride and into this solution at a temperature of about 25°–30° C. there is gradually introduced, with stirring 10 parts of 1.4-paratoluido-anthraquinone (which is commonly known as quinizarine green and obtainable by condensing two molecular proportions of para-toluidine with one molecular proportion of quinizarine) at such a rate that the temperature does not exceed about 35° C. After all of the quinizarine green has been added, the temperature of the mixture is slowly raised to about 50° C. and maintained at this temperature for about 3 to 4 hours and until a test portion is found to be completely soluble in hot water. When the reaction is completed, the reaction mixture is poured into about 1000 parts of cold water. A pure blue solution is obtained which on standing or on heating to about 45°–50° C., or higher, changes to a green color. To the solution thus obtained there is added sufficient common salt to nearly saturate the solution at a temperature of about 40°–50° C. It is then cooled to about 25° C. at which temperature it becomes saturated with common salt, and stirred until no further precipitation of dyestuff takes place. The dyestuff is then filtered off, washed with a cold 24 percent salt solution, pressed and dried.

The dyestuff thus obtained is in the form of a sodium salt and is very soluble in water and in dilute acids and from such solutions is not readily and completely salted out, about two percent of it in the above example, for instance, escaping in the filtrate. In the dry state, it constitutes a dark green powder which is substantially insoluble in chloroform and almost so in benzene. It is soluble in concentrated sulfuric acid giving a bluish green solution which on gradual dilution with much water passes through a violet to a yellowish-green and finally to a bluish-green solution. It dyes wool from an acid bath bluish-green tints which are considerably yellower in shade than the tints produced by the dyestuff prepared by the sulfonation of quinizarine green with oleum of the same or a weaker strength, or with sulfuric acid, in the absence of boric acid. Upon reduction with zinc and dilute acetic acid, it yields a yellow leuco derivative which can be readily re-oxidized by the air to the original green dyestuff. Boiling dilute sulfuric acid decomposes the leuco derivative.

It will be understood that the present invention is not confined to the particulars given in the above example which is merely typical and can be varied without altering thereby the nature and scope of the invention. For example, the strength of the oleum may vary from an oleum containing only a small percentage of free sulfuric anhydride, for instance about 10 percent, to one containing a larger percentage, for instance about 30 percent; but a strength of about 20 to 26 percent is preferred. The amount of boric acid employed may also vary, but an amount equal to about one-quarter to one-half the weight of quinizarine green is preferred. Preferably, temperatures between 30° and 50° C. are employed but the temperature depends somewhat on the strength and amount of oleum used. As a rule, the weaker the oleum the higher the temperature which may be employed. The time of sulfonation should not ordinarily be longer than about 3 to 5 hours otherwise a dyestuff giving dull shades is apt to be produced.

I claim:

1. In the production of a dyestuff of the anthraquinone series, a process which comprises sulfonating a 1.4-diarylaminoanthraquinone in which the aryl groups belong to the benzene series with oleum not to exceed 30 per cent strength in the presence of boric acid.

2. In the production of a dyestuff of the anthraquinone series, a process which comprises sulfonating a 1.4-diarylaminoanthraquinone in which the aryl groups belong to the benzene series with oleum containing about 20 to 26 percent free sulfuric anhydride in the presence of boric acid.

3. In the production of a dyestuff of the anthraquinone series, a process which comprises sulfonating quinizarine green with oleum not to exceed 30 per cent strength in the presence of boric acid.

4. In the production of a dyestuff of the anthraquinone series, a process which comprises sulfonating quinizarine green with oleum containing 20 to 26 percent free sulfuric anhydride in the presence of boric acid.

5. In the production of a dyestuff of the anthraquinone series, a process which comprises sulfonating quinizarine green with oleum of about 10 to 30 per cent strength in the presence of an amount of boric acid equal to about one-quarter to one-half the weight of quinizarine green.

6. In the production of a dyestuff of the anthraquinone series, a process which comprises sulfonating quinizarine green with about ten times its weight of oleum containing about 20 to 26 percent free sulfuric anhydride in the presence of about one-half its weight of boric acid at a temperature not to exceed about 50° C.

7. As a new product, the dyestuff obtainable by the sulfonation of a 1.4-diarylaminoanthraquinone in which the aryl groups belong to the benzene series with oleum of about 10 to 30 per cent strength in the presence of boric acid, said dyestuff in the dry and pulverized state being a dark green powder easily soluble in water, substantially insoluble in chloroform, and dyes wool from an acid bath yellowish blue-green shades.

8. As a new product, the dyestuff obtainable by the sulfonation of quinizarine green with oleum of about 10 to 30 per cent strength in the presence of boric acid, said dyestuff in the dry and pulverized state being a dark green powder soluble in water, substantially insoluble in chloroform and nearly so in benzene, and dyeing wool from an acid bath green shades.

9. Material dyed with a dyestuff of claim 7.

10. Material dyed with the dyestuff of claim 8.

In testimony whereof I affix my signature.

JAMES OGILVIE.